Dec. 23, 1952     E. H. R. PEGG ET AL     2,622,696
DUST COLLECTOR
Filed Nov. 10, 1950     4 Sheets—Sheet 2

INVENTORS
EDWARD H. R. PEGG
BY DONALD P. ROSS
Benj. T. Rauber
ATTORNEY

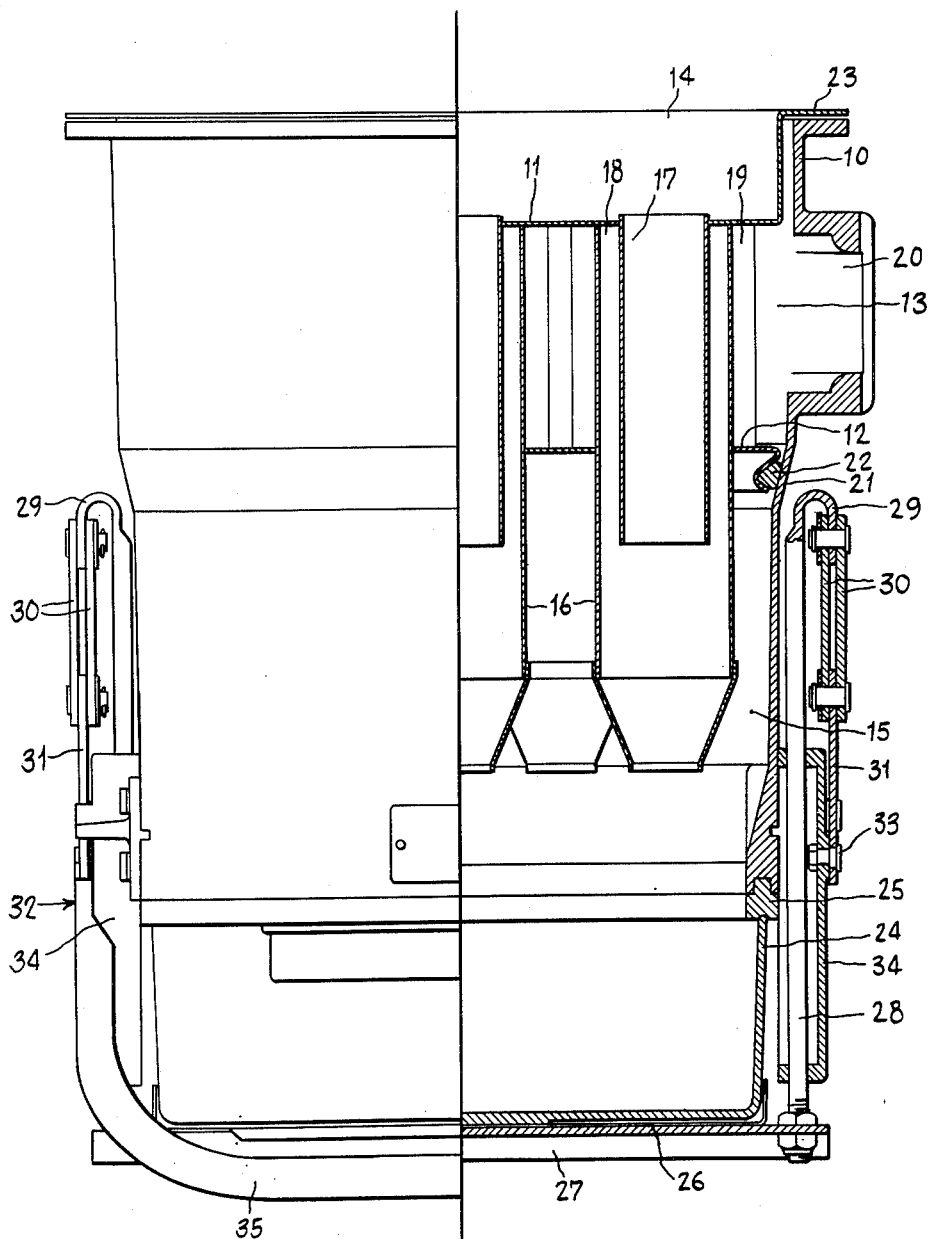

Dec. 23, 1952 E. H. R. PEGG ET AL 2,622,696
DUST COLLECTOR
Filed Nov. 10, 1950 4 Sheets-Sheet 4

INVENTORS
EDWARD H. R. PEGG
BY DONALD P. ROSS

Benj. T. Rauber
ATTORNEY

Patented Dec. 23, 1952

2,622,696

UNITED STATES PATENT OFFICE 2,622,696

DUST COLLECTOR

Edward H. R. Pegg, Port Chester, and Donald P. Ross, New York, N. Y., assignors to The Aerotec Corporation, Greenwich, Conn., a corporation of Connecticut Application November 10, 1950, Serial No. 194,948

4 Claims. (Cl. 183—84)

1

Our present invention relates to dust collectors more particularly for the separation of suspended abrasives used in the abrasive cutting of dental cavities.

Recently there has been developed a method of removal of decayed parts of teeth, and for the shaping and preparation of dental cavities to be filled, by the use of a blast of abrasive particles such as particles of aluminum oxide.

In this method a fine stream or jet of air carrying suspended particles of the abrasive is directed to that portion of the tooth that is to be ground or cut away. The particles of abrasive erode the portion of the tooth to be removed and the abrasive and eroded tooth material are carried away by air drawn from the cavity.

The present invention is directed to the separation of the used abrasive with a view to prevent it from being scattered about the atmosphere of the dental operating room where the presence of the abrasive and particularly of eroded material would be objectionable. The suspended waste material may be effectively separated by a multi-tube centrifugal separator of small size into a dust chamber.

Our present invention provides a receiver for the material separated in the multi-tube separator which may be easily sealed to the separator during the separation of the particles and readily released and withdrawn for emptying when the separator is not in use.

In our invention we provide a dust receiving pan the upper edge of which fits airtight against the lower edge or rim of a dust chamber enclosing the particle discharge ends of the centrifugal tubes, a suitable gasket being provided on the lower edge of the dust chamber. When sealed against the lower rim the pan closes the chamber and receives the separated particles. The pan is held tightly against the rim in closed position by a supporting tray which permits the pan to be lowered for removal. For this purpose the supporting tray may be lifted by a toggle leverage to close and seal the dust chamber and lowered to release the pan so that it may be withdrawn in the manner of a drawer for emptying. Or the shelf may be stationary and the pan lifted from the shelf by eccentric on either the shelf or pan.

The various features of the invention are illustrated by way of example in the accompanying drawings in which Fig. 1 is a side elevation of a dust collector embodying a preferred form of the invention, the toggle levers and pan being shown in closed position in full lines and in open position in broken lines;

Fig. 3 is a part sectional elevation of the dust collector taken on line 3—3 of Fig. 2;

Figure 1:
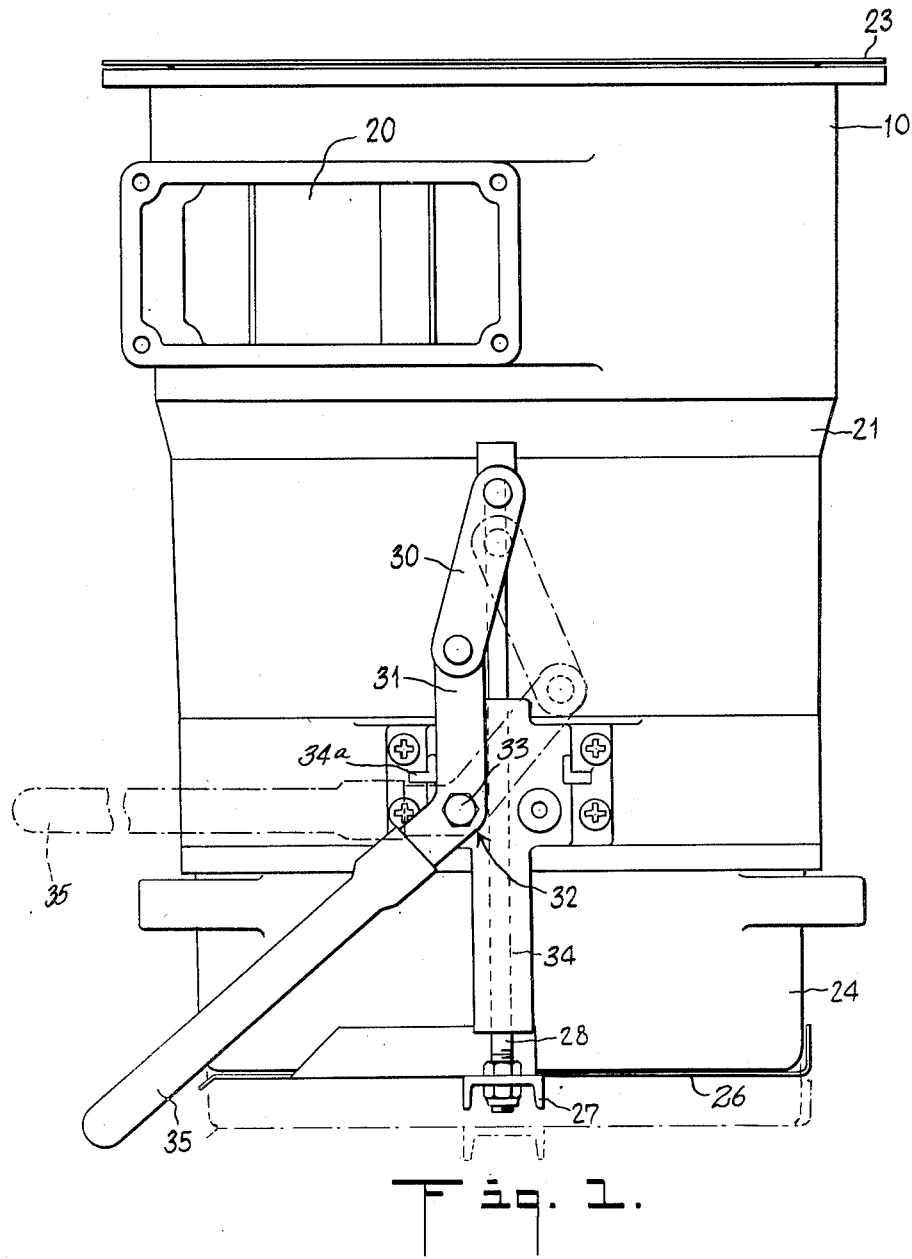

Referring more particularly to the embodiment shown in Figs. 1, 2 and 3, the invention is illustrated as applied to a centrifugal separating apparatus with a casing 10 having partitions 11 and 12 which divide the casing into an intermediate intake chamber 13, an outlet chamber 14 above the chamber 13, and a particle or dust receiving chamber 15 below the chamber 14.

Supported between the partitions 11 and 12 is a group of centrifugal separating tubes 16, each tube having an open-ended off-take pipe 17 mounted centrally in the upper part of the tube in the partition 11 and forms with its respective tube an annular passage 18 open at its lower end. Each tube is provided with one or more tangential inlet openings 19 so that the particle laden or dust laden air which enters the chamber 13 through an inlet 20 is given a rotatory or helical motion downwardly to the lower end of the off-take pipe 17 at which point the air reverses its axial direction of movement and passes upwardly into the off-take chamber 14 while the particles which have been thrown outwardly against the inner surface of the tube 16 move downwardly into the dust collecting chamber 15.

The partitions 11 and 12 together with the centrifugal tubes nested in them may be removed upwardly through the open end at the top of the casing. For this purpose the wall of the casing is narrowed at 21 at or immediately below the level of the partition 12 and the peripheral edge of the partition is recessed to hold a gasket 22 of rubber or similar resilient material.

The upper partition 11 is provided with an outward flange 23 on which a cover, not shown, may be mounted to press the flange into airtight contact with the casing. An outlet is provided in this cover.

The lower end of the casing is open but is provided with a collecting pan 24 which, when the apparatus is in operation is tightly sealed against a gasket 25 on the lower rim or edge of the casing so as to form a closed dust or particle collecting chamber.

The separated particles fall downwardly through the dust chamber and are received and collected in the pan 24. At intervals the operation of the apparatus may be interrupted, the pan 24 lowered and withdrawn for the disposal of the collected particles. It may then be replaced and sealed against the gasket 25.

The pan 24 is supported in its raised and lowered positions by a tray 26 which is mounted on the casing below the bottom of the pan 24 for vertical movement. The tray is supported by a yoke comprising a bottom transverse piece 27 and a pair of vertical suspending rods 28, the upper ends of which are turned outwardly through 180° to form downwardly extending supporting edges 29, there being one such end on each side of the casing. To each of these edges or ends is attached a pair of links 30 the lower ends of which are pivotally secured to an arm 31 of an operating lever 32. The lever 32 is pivoted as at 33 to a bracket 34 secured to the casing, there being one bracket arranged diametrically opposite the other on the casing. The brackets 34 also serve as guides for the rods 28. Each lever is connected to a U-shaped yoke 35 which forms the arm for both of the levers on opposite sides of the casing so that when the arm 35 is moved, both levers are tilted simultaneously and equally.

As shown in Fig. 1, when the arm 35 is pushed downwardly to a level below that of the pan 24, arm 31 and links 30 of each leverage system have been rotated to a position slightly beyond alignment against stop 34ª thereby lifting the tray and the pan to bring them into airtight engagement with the gasket 25 and locking the arm 35 in closed position. When the lever 35 is swung to the position shown in dotted lines in Fig. 1 with the lever 35 above the pan 24, the tray and with it the pan are lowered clear and free from the gasket 25 and the pan may then be slid off the tray and removed for disposal of the collected particles.

This embodiment provides a very compact dust collecting element in which the dust collecting pan may quickly and easily be sealed to or removed from sealing engagement with the lower part of the dust or particle receiving chamber of the casing. Means may also be provided in the way of an automatic electric switch so as to interrupt the circuit to the operating motor whenever the lever 35 is in its lifted position and the pan lowered from sealing engagement with the dust chamber and to close this circuit when the pan is lifted and the dust chamber is sealed.

Figure 2:
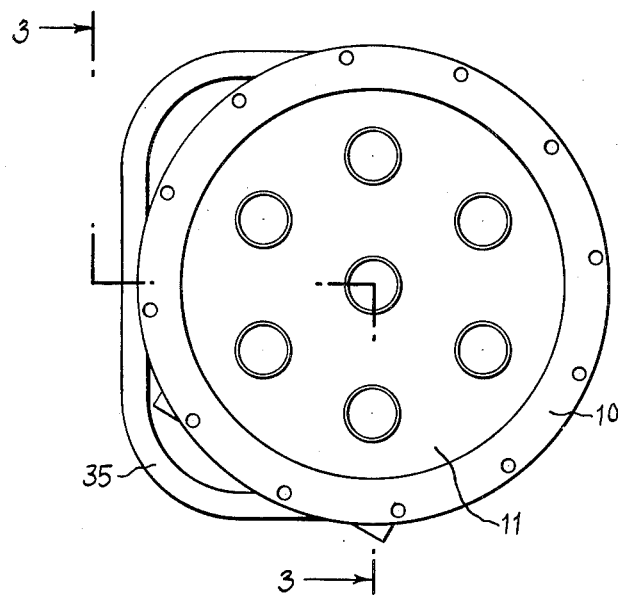
Fig. 2 is a plan of the dust collector shown in Fig. 1.
Figure 4:
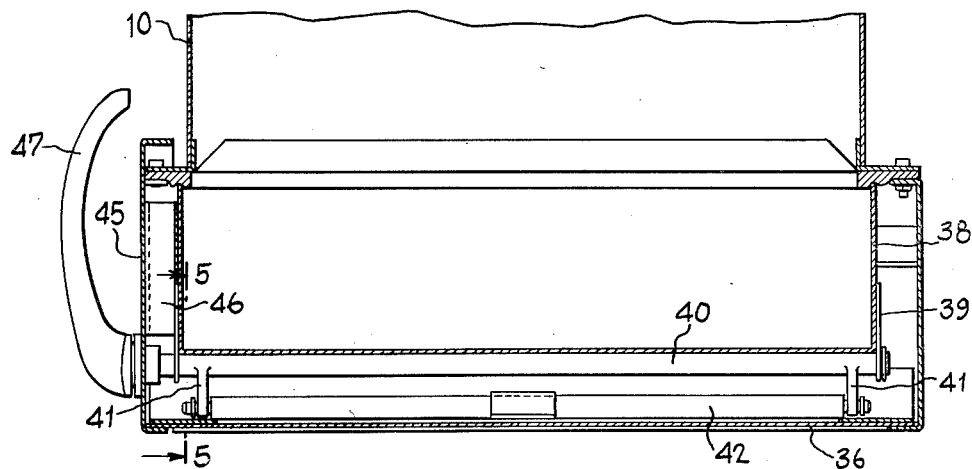
Fig. 4 is a vertical section of a dust chamber embodying a modification of the invention.
Figure 5:
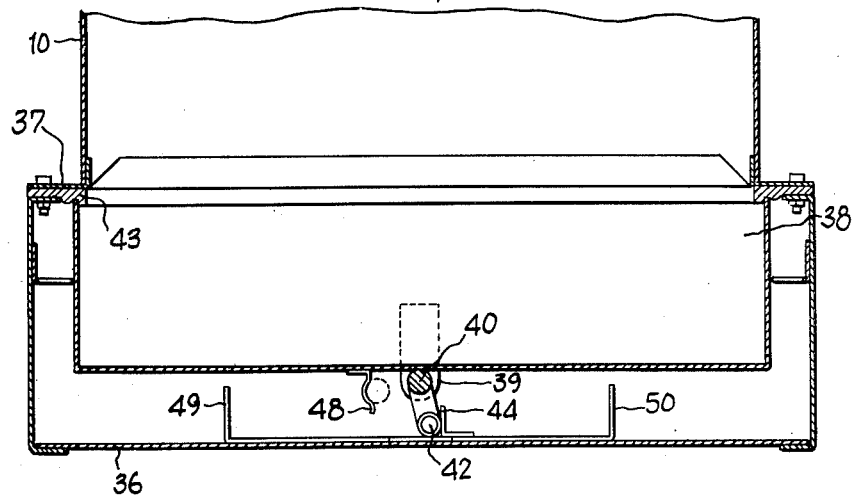
Fig. 5 is a section taken at right angles to that of Fig. 4.

In the embodiment shown in Figs. 4 and 5, the separating apparatus may be similar to that of Figs. 1, 2 and 3, but in this embodiment a tray 36 is fixed in position on the casing 10 by means of side brackets 37. Between the bottom of the tray and the lower end of the casing is a dust collecting pan 38 having mounted on its undersurface by means of spaced lugs 39 a rotatable shaft 40 which has fixed to it short arms 41 carrying a bar or roller 42 which rests on the tray 36 when the pan 38 is lifted into sealing engagement with a gasket 43 on the lower edge of the casing 10. In this position, as shown in Fig. 5, the roller is somewhat to the right of vertical alignment with the axis of the shaft 40 and rests against a stop 44. A cover plate 45 is mounted by means of brackets 46 on the front end of the pan. The shaft 40 extends forwardly through the plate and is provided with a handle 47 by which it may be turned and with it the shaft 40. When the shaft 40 is turned clockwise, as in Fig. 5, the roller 42 swings to the position shown in dotted lines against a spring catch 48 removing the support for the pan, which is thereby lowered until it rests on a pair of spaced guides 49 and 50. In this position it is released from contact with the lower end of the casing and may be slid forwardly and removed for disposal of the collected material.

Figure 6:
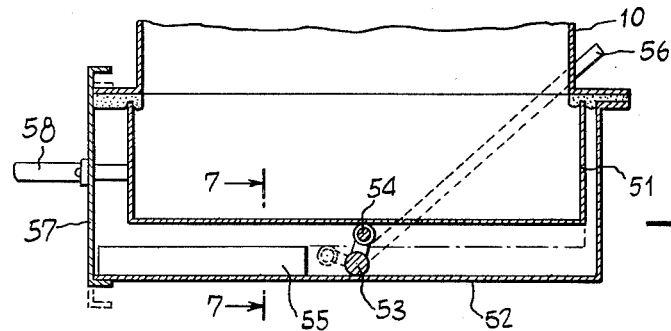
Fig. 6 is a vertical section of a dust chamber embodying still another modification.
Figure 7:
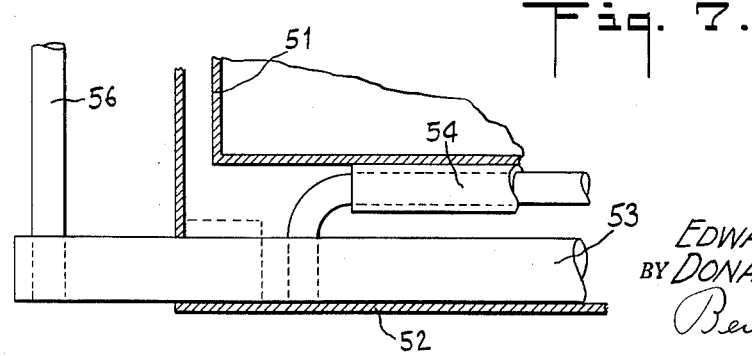
Fig. 7 is part sectional view taken on the line 7—7 of Fig. 6.

In the embodiment shown in Figs. 6 and 7, a pan 51 is raised and lowered relative to a tray 52 by means of a rock shaft 53 having an eccentrically spaced roller 54 mounted thereon in such position that when the shaft 53 is rocked in one position it lifts the pan upwardly against the lower edge of the casing and slightly past dead center while, when rocked counterclockwise as in Fig. 6, lowering the roller 54 the pan is lowered until it rests upon supporting rails 55 free from the casing so that it may be withdrawn. The roller 53 extends through the sides of the tray and is connected at each end by means of U-shaped or bale-like lever 56. The pan 51 is provided with a face plate 57 and a handle 58 by which it may be drawn forwardly when lowered.

Through the above invention we have provided means whereby a collecting pan may be readily sealed to and released from the dust collecting compartment or chamber of a separating apparatus so that it may be emptied, or its contents disposed of at frequent intervals. The apparatus is particularly suited for centrifugal multi-tube separators of dental apparatus because of its compact space and the ease with which the collected material may be removed. While the apparatus is particularly suited for the multi-tube apparatus illustrated, it will be understood that it may be used for other types or forms of separators.

Having described our invention, what we claim is:

1. A particle separating apparatus having a particle receiving compartment open at its lower end, a pan below and in position to be lifted into sealing engagement with said particle receiving compartment, a vertically moving tray supporting said pan, brackets on opposite sides of said compartment having vertically aligned guide openings, tray supporting rods extending upwardly from said tray through said openings, one on each side of said compartment, a lever pivoted on the brackets and having arms on each side of said compartment and links extending upwardly from said arms to said supporting rods.

2. The apparatus of claim 1 in which said lever arms extend upwardly in position to swing in one direction past alignment with said links to lift said tray and reversely downwardly to lower said tray and release said pan.

3. A particle separating apparatus having a particle receiving compartment open at its lower end, a pan below and in position to be lifted into sealing engagement with said particle receiving compartment, a vertically movable tray positioned below said particle receiving compartment to permit said pan to be slid onto said tray into position below said particle receiving compartment, brackets on opposite sides of said compartment having vertically aligned guide openings, tray supporting rods extending upwardly from said tray through, and slidably in, said openings, one on each side of said compartment and being turned downwardly above said bracket, a U- shaped lever extending from one bracket about said pan to the other bracket and pivoted on said brackets and having an upwardly extending arm and pairs of links, one pair for each side of said compartment connecting said upwardly extending arm of said lever to the downturned end of said tray supporting rods.

4. The apparatus of claim 3 in which said particle separating apparatus comprises an outlet chamber and an intake chamber, and centrifugal separating tubes positioned to separate suspended particles from air passing through the intake chamber and to deliver said particles to the particle receiving chamber.

EDWARD H. R. PEGG.
DONALD P. ROSS.

REFERENCES CITED

The following references are of record in the file of this patent:

UNITED STATES PATENTS

| Number | Name | Date |
|---|---|---|
| 971,390 | Matchette | Sept. 27, 1910 |
| 1,109,639 | Sutton | Sept. 1, 1914 |
| 1,930,806 | Horne et al. | Oct. 17, 1933 |